United States Patent
Richter

(10) Patent No.: US 6,913,232 B2
(45) Date of Patent: *Jul. 5, 2005

(54) ARTICLE SUPPORT SYSTEM

(76) Inventor: Herbert Richter, Drosselweg 8, 75331 Engelbrand (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/600,794

(22) Filed: Jun. 20, 2003

(65) Prior Publication Data

US 2004/0256529 A1 Dec. 23, 2004

(51) Int. Cl.$^7$ ............................................. A45D 42/14
(52) U.S. Cl. ............................ 248/205.8; 248/309.3; 248/205.5; 248/206.2
(58) Field of Search .................... 248/206.2, 205.5, 248/500, 205.8, 205.6, 205.7, 205.9, 205.4, 683, 363, 362, 309.3

(56) References Cited

U.S. PATENT DOCUMENTS

| | | | | |
|---|---|---|---|---|
| 3,020,017 A | * | 2/1962 | Watson | 248/205.8 |
| 3,082,988 A | * | 3/1963 | Holden | 248/205.8 |
| 5,740,995 A | * | 4/1998 | Richter | 248/220.21 |
| 5,779,205 A | * | 7/1998 | Ching | 248/205.8 |
| D398,217 S | * | 9/1998 | Richter | D8/349 |
| D413,897 S | * | 9/1999 | Richter | D14/253 |
| 5,996,950 A | * | 12/1999 | Richter | 248/205.5 |
| D419,415 S | * | 1/2000 | Richter | D8/71 |
| 6,135,408 A | * | 10/2000 | Richter | 248/309.4 |
| 6,234,435 B1 | * | 5/2001 | Yeh | 248/205.5 |
| 6,663,064 B1 | * | 12/2003 | Minelli et al. | 248/205.5 |
| 6,749,160 B1 | * | 6/2004 | Richter | 248/206.2 |

* cited by examiner

Primary Examiner—Kimberly Wood
(74) Attorney, Agent, or Firm—Klaus J. Bach

(57) ABSTRACT

In an article support system including a housing with a base defining a cavity, a suction disc supported in the cavity so as to delimit the cavity, and a mechanism for actuating the suction disc so as to create a vacuum between the suction disc and a smooth support surface, the housing includes at its end opposite the base an article support plate with engagement claws for engaging a particular article, and a mounting plate is provided for connection to a support surface, which has a smooth surface for mounting the device selectively thereon by way of the suction disc or on a clamp support plate.

5 Claims, 5 Drawing Sheets

ARTICLE SUPPORT SYSTEM

BACKGROUND OF THE INVENTION

The invention relates to an article support system, that is, a system for supporting an article on various surfaces and in various ways, particularly in a motor vehicle.

Devices for supporting articles such as cellular phones, for example on the dashboard or by suction cups on a window are known. They have generally however the disadvantage that they are limited to a particular support arrangement. The support arrangement may include a suction cup holder, it may include a screw-down structure or a hook-and-loop (velcro) structure. The support device may also be cemented to the support surface.

Each of these arrangements has its limitations. There are advantages and disadvantages to each of the support arrangements but one particular arrangement must be chosen by the user.

It is therefore the object of the present invention to provide an article support system with an article holder, which can be mounted to a support base and which can engage an article in various ways.

SUMMARY OF THE INVENTION

In an article support system including a housing with a base defining a cavity, a suction disc supported in the cavity so as to delimit the cavity, and means for actuating the suction disc so as to create a vacuum between the suction disc and a smooth surface, the housing includes at its end opposite the base an article support plate with engagement claws for selectivity engaging one of an article and an adapter plate having means for engaging a particular article, and a mounting plate is provided which has at one side means for connection to a support surface and at the other side a smooth surface for mounting the device selectively thereon by way of the suction disc or on a clamping support plate engaging at one side a rim of the base and provided with a clamping member for mechanically engaging the base and having means for mounting the clamping support plate to a support surface.

With the system according to the invention, an article can be supported on the support device in various ways. It may be directly mounted to the support surface by direct engagement with the claw members or an adapter piece provided with openings for engagement with the claw member is attached to the article to be supported and is engaged with the claw members. The adapter piece may be connected to the article to be supported by cementing, by magnetic holding means or by a velcro structure for example.

As noted, the support device includes a base with a suction structure for mounting the support device to a smooth flat surface such as a window pane. However, the system includes also a disc which can be mounted onto a support base and onto which the support device can be mounted by means of its suction structure. The disc may be mounted to the support base for example by cementing or it may be screwed thereon. The support device also includes a foot flange structure by way of which it can be clamped onto an engagement member provided with clamping means. Preferably, the engagement member and the foot flange structure are circular so that the support device can be rotated to any particular position convenient to the user upon loosening of the clamping means.

The invention will be described below in greater detail on the basis of the accompanying drawings.

DESCRIPTION OF A PARTICULAR EMBODIMENT OF THE SYSTEM

Figure 1:
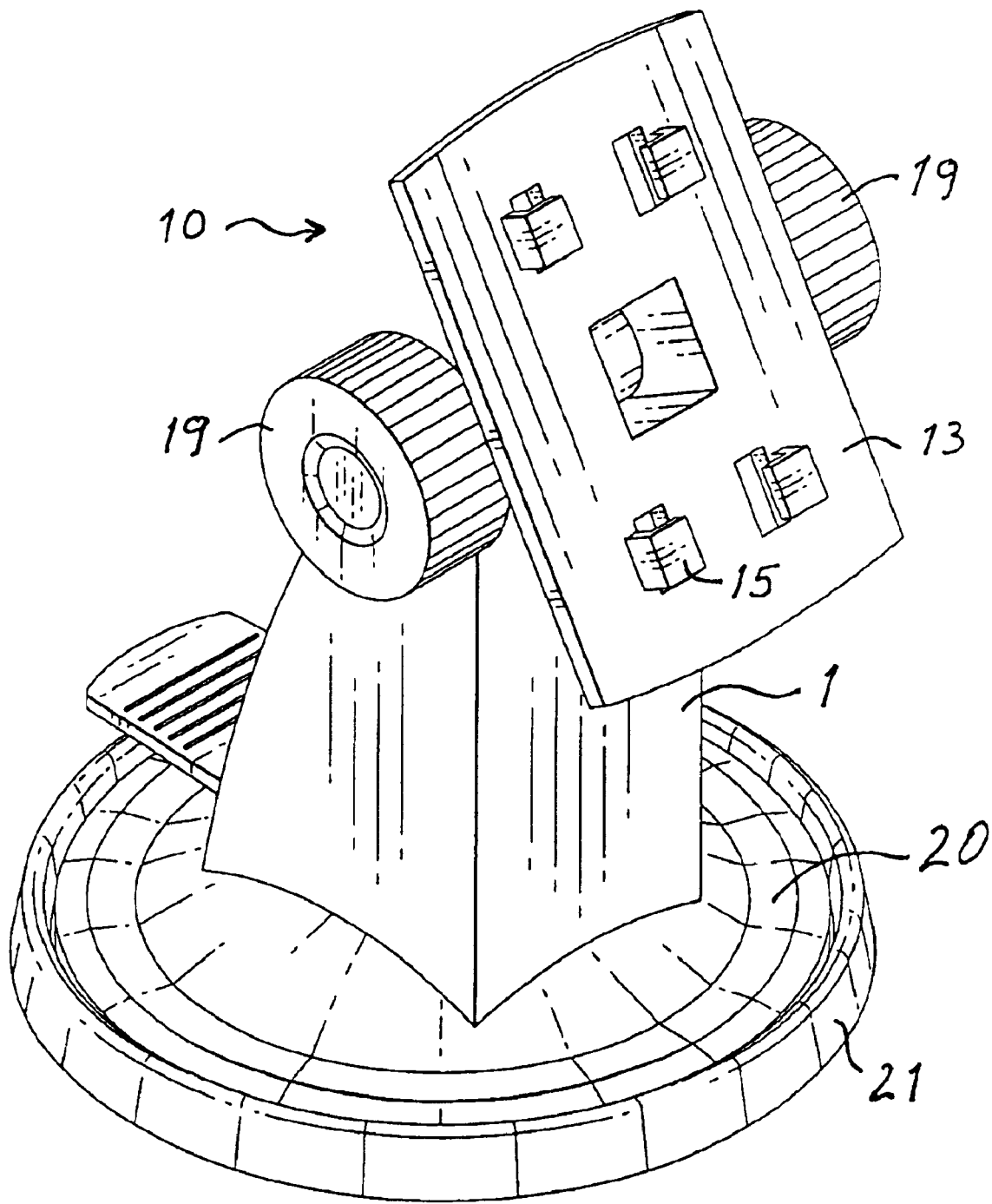
FIG. 1 is a perspective view of an article support device mounted, by a suction structure, to a support disc, which may be firmly connected to a support surface.

The article support system according to the invention comprises an article support column 1 with a base 20 and a support structure 10 which is pivotally supported in the column 1. The column 1 includes an operating mechanism for operating a suction disc 2 (FIG. 3) disposed in the base 20. The base 20 includes a cavity 3 across which the suction disc 2 extends. The housing 1 also includes a sleeve 5 receiving a rod 4, which is connected to the disc 2 for operating the disc 2. A shaft 18 extends transversely through the rod 4 and through axial slots 6 forked in the sleeve 5 and also through actuating arms 9a and 9b of a U-shaped actuating member 9. The actuating arms 9a and 9b are provided with cams 9c, which engage the base 20 at opposites sides of the sleeve 5 so that, upon pivoting the U-shaped actuating member 9 toward the base 20, the shaft 18 and, together therewith, the rod 4 are moved upwardly in the sleeve 5 thereby pulling the suction disc 2 into the housing 1 as the cams 9c ride on the base 20.

At its end remote from the suction disc 2, the rod 4 is provided with a surface 8 on which one end of a compression coil spring 7 is supported. The coil spring 7 is supported with its other end on the end wall 5a of the sleeve 5. The coil spring 7 exerts a force on the rod 4 whereby the suction disc 2 is biased outwardly of the cavity 3 of the housing 1 when it is not fixed in a retracted position by the cams 9c of the actuating member 9.

Figure 8:
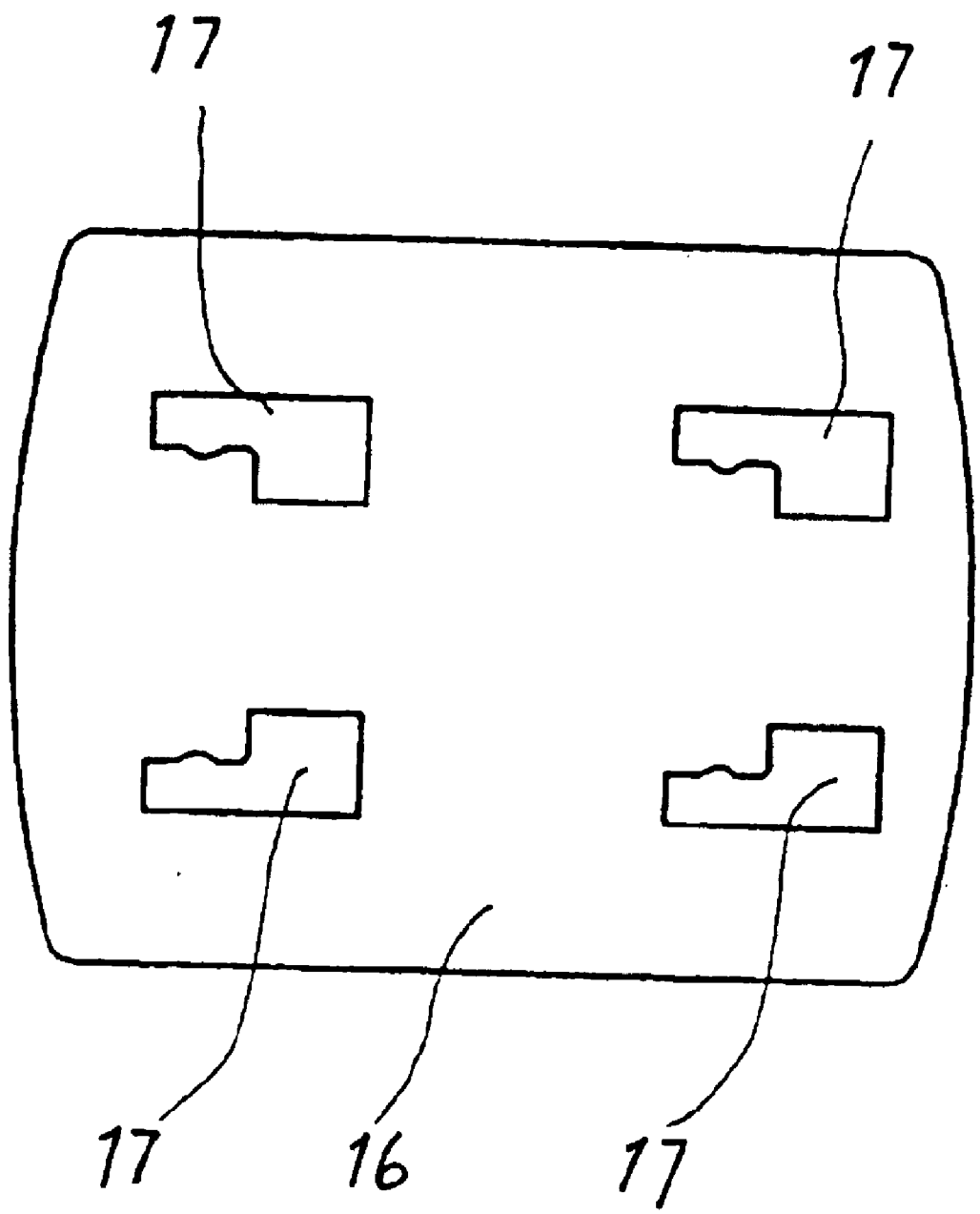
FIG. 8 is a plan view of an adapter plate for engagement with the article support member of the article support device shown in FIG. 1.

At the end opposite the suction disc 2, a support structure 10 is pivotally supported by the housing 1. The support structure 10 includes an article support plate 13 with claws 15 for the engagement of a mounting plate 16 (FIG. 8) which is provided with openings 17 for receiving the claws 15. The mounting plate 13 may be an engagement structure provided on an article to be supported or it may be an adapter plate to which an article to be supported is otherwise attached for example by cementing, by magnetic engagement or by a hook-and-loop structure. The article may be for example a telephone holder or a holder of another electronic device such as a TV screen. The support plate 13 is provided with a mounting arm 14 (FIG. 3) by which it is pivotally supported on the housing 1 via a shaft 12 extending through the housing 1 and the mounting arm 14. The shaft 12 has threaded opposite ends onto which locking knobs 19 are threaded for locking the mounting arm 14 and the support plate 13 in any desired angular position.

Figure 2:
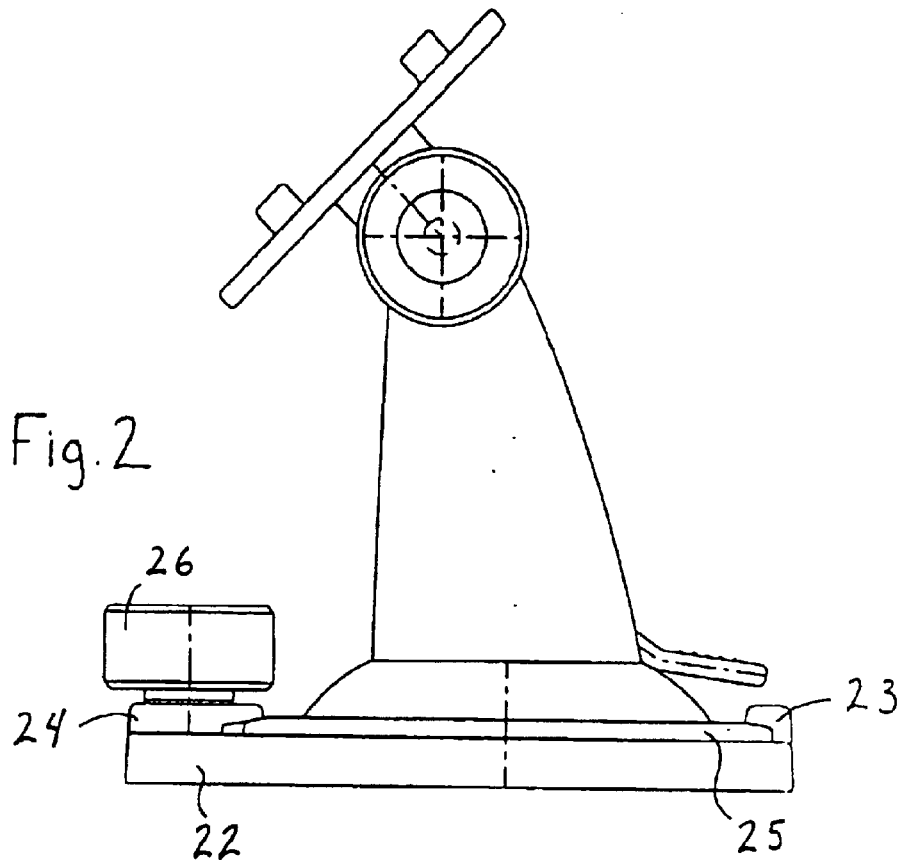
FIG. 2 is a side view of the article support device supported on an engagement member with clamping means for mounting the article support device to on the engagement member.
Figure 3:
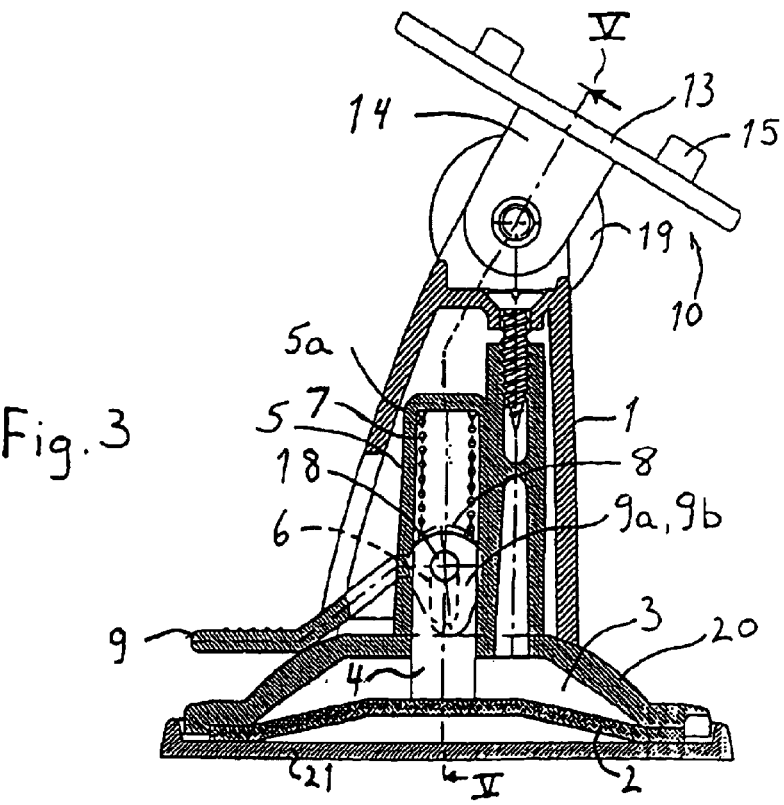
FIG. 3 shows the article support device of FIG. 1 in cross-section showing the suction disc and operating structure for engagement with the support disc.
Figure 4:
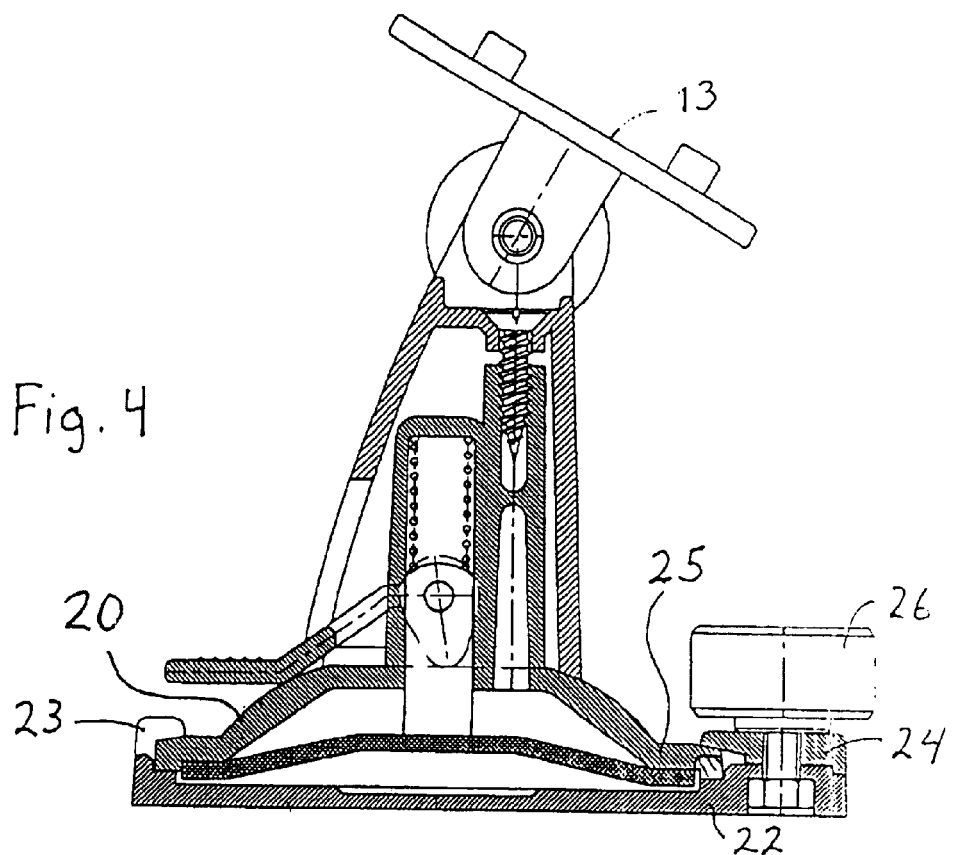
FIG. 4 shows the article support device of FIG. 2 in a cross-sectional side view.
Figure 5:
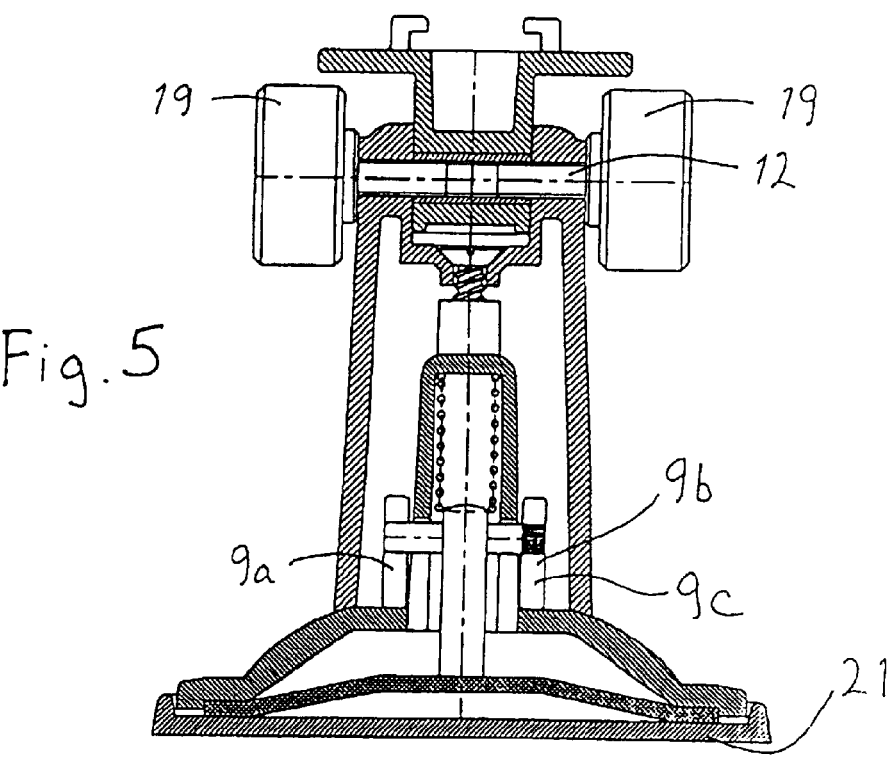
FIG. 5 shows the article support device in a cross-sectional view taken along line V—V of FIG. 3.
Figure 6:
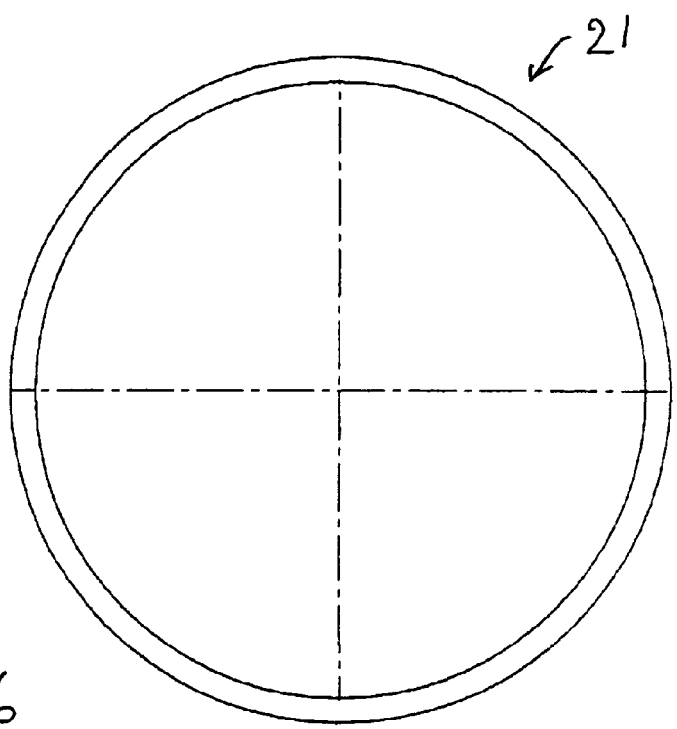
FIG. 6 is a top view of the support disc for mounting the article support device using the suction structure.
Figure 7:
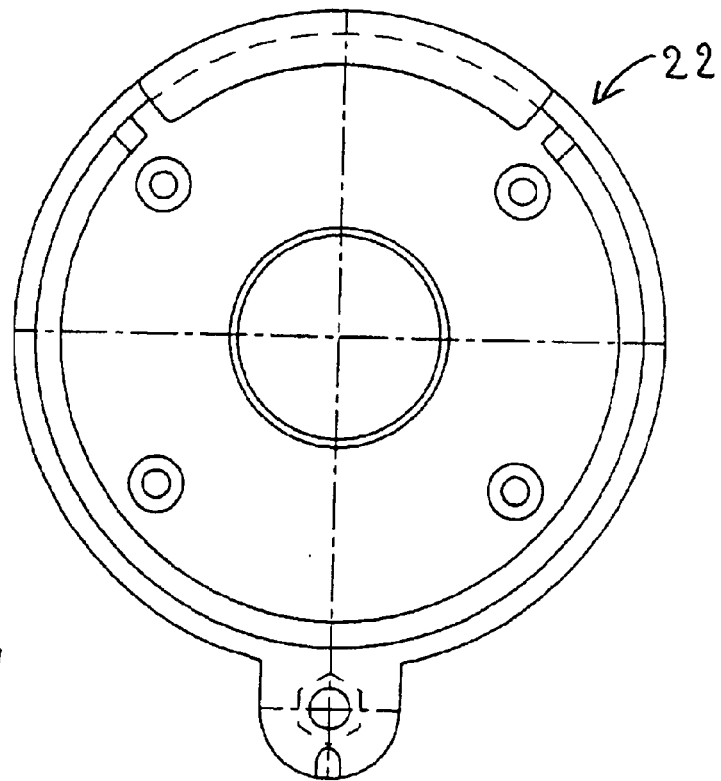
FIG. 7 is a top view of the engagement member shown in FIGS. 2 and 4.

The device can be directly attached to a flat smooth surface by suction that is by moving the actuating member 9 into a locking position as shown in FIG. 3. In FIGS. 3 and 5, the device is shown attached to a mounting plate 21, which may be connected to a support surface by cementing or other attaching means. In FIGS. 2 and 4, the device is shown rotatably supported by a clamp support structure including a clamp mounting plate 22 having an engagement claw 23 and at the opposite end a clamping member 24 by which the rim 25 of the base 20 can be firmly engaged by a knurled head screw 26 for locking the device onto the clamp mounting plate 22. The clamp mounting plate 22 may be attached to a support surface also for example by cementing or it may be screwed to a support surface. A suction mounting plate 21 or a clamp mounting plate 22 can be mounted onto rough surfaces, on which the suction disc would not hold the support device.

With the system according to the invention, the device can be attached directly to a smooth flat surface, it can be attached selectively by way of a mounting disc 21 by suction or mechanically by way of a clamp mounting plate 22. An article can be supported directly on the article support plate 13 if the article bias means permitting its engagement by the claws 15 or by way of an adapter plate 16 provided at one side with means to be engaged by the claws 15 and at the opposite side with particular means for engaging the respective article.

What is claimed is:

1. An article support system including: a housing (1) having a housing base (20) with a cavity (3) and a rim (25) extending around said cavity (3), a suction disc (2) supported in said housing base (20) so as to delimit said cavity (3), an operating rod (4) movably supported in said housing (1) and connected to said suction disc (2), a compression spring (7) disposed in said housing (1) behind said operating rod (4) so as to bias the operating rod (4) and, together therewith, the suction disc (2) outwardly from said base 20 and into contact with a surface on which the housing (1) is disposed, a operating means (9, 9a, 9b) connected to said operating rod (4) for pulling said suction disc into said cavity (3) against the force of said compression spring (7) to create a vacuum between said suction disc (2) and support surface on which said housing (1) is disposed, said housing (1) including at its end opposite said base (20) an article support plate (13) having engagement claws (15) for selectively engaging an article provided with means permitting its engagement by said engagement claws (15) said system further including a mounting plate (21) provided at one side with means for its connection to said support surface and having at another side a smooth surface for selectively mounting said housing base (20) thereon by means of said suction disc (2), or a clamp support plate (22) provided with means for engaging said housing base (20) and also with means for mounting said clamp support plate (22) to said support surface.

2. A support system according to claim 1, wherein said article support plate (13) is pivotally supported on said housing (1) so as to permit adjustment of the support angle of an article supported by said support plate (13).

3. A support system according to claim 1, wherein said housing base (20) is rotatably supported on said clamping support plate (22) so as to permit adjustment of angle of the support device about an axis normal to the support plate (22).

4. A support system according to claim 1, wherein an operating arm is pivotally supported on said operating rod (4) and includes at opposite sides of the operating rod (4) cams (9a, 9b) which engage the housing base (20) so as to lift the operating rod (4) and pull the suction disc (2) into the base (20) to generate a vacuum between the suction disc (2) and a surface on which it is supported.

5. A support system according to claim 1, wherein said engagement means are claws (15) projecting from said support plate (13) and said article or, respectively, a adapter plate have openings receiving said claws (15).

\* \* \* \* \*